Nov. 17, 1964    G. H. HURST, JR., ETAL    3,157,059
GEAR SHIFT MECHANISM
Filed Jan. 4, 1963    4 Sheets-Sheet 2

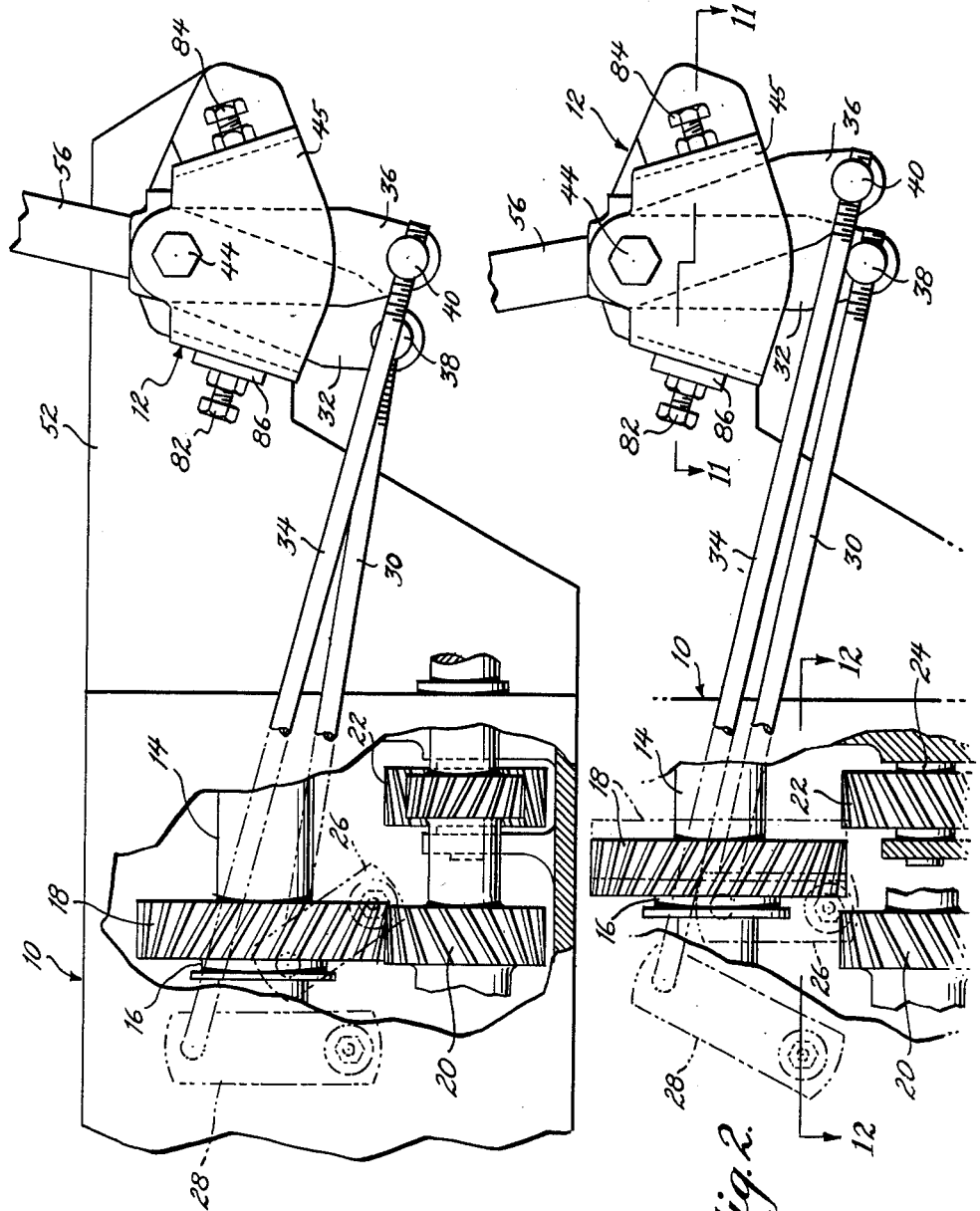

INVENTORS.
GEORGE H. HURST, JR.
WILLIAM G. CAMPBELL
BY
ATTORNEY.

Nov. 17, 1964   G. H. HURST, JR., ETAL   3,157,059
GEAR SHIFT MECHANISM
Filed Jan. 4, 1963   4 Sheets-Sheet 3

INVENTORS.
GEORGE H. HURST, JR.
WILLIAM G. CAMPBELL
BY
ATTORNEY.

Nov. 17, 1964 G. H. HURST, JR., ETAL 3,157,059
GEAR SHIFT MECHANISM
Filed Jan. 4, 1963 4 Sheets-Sheet 4
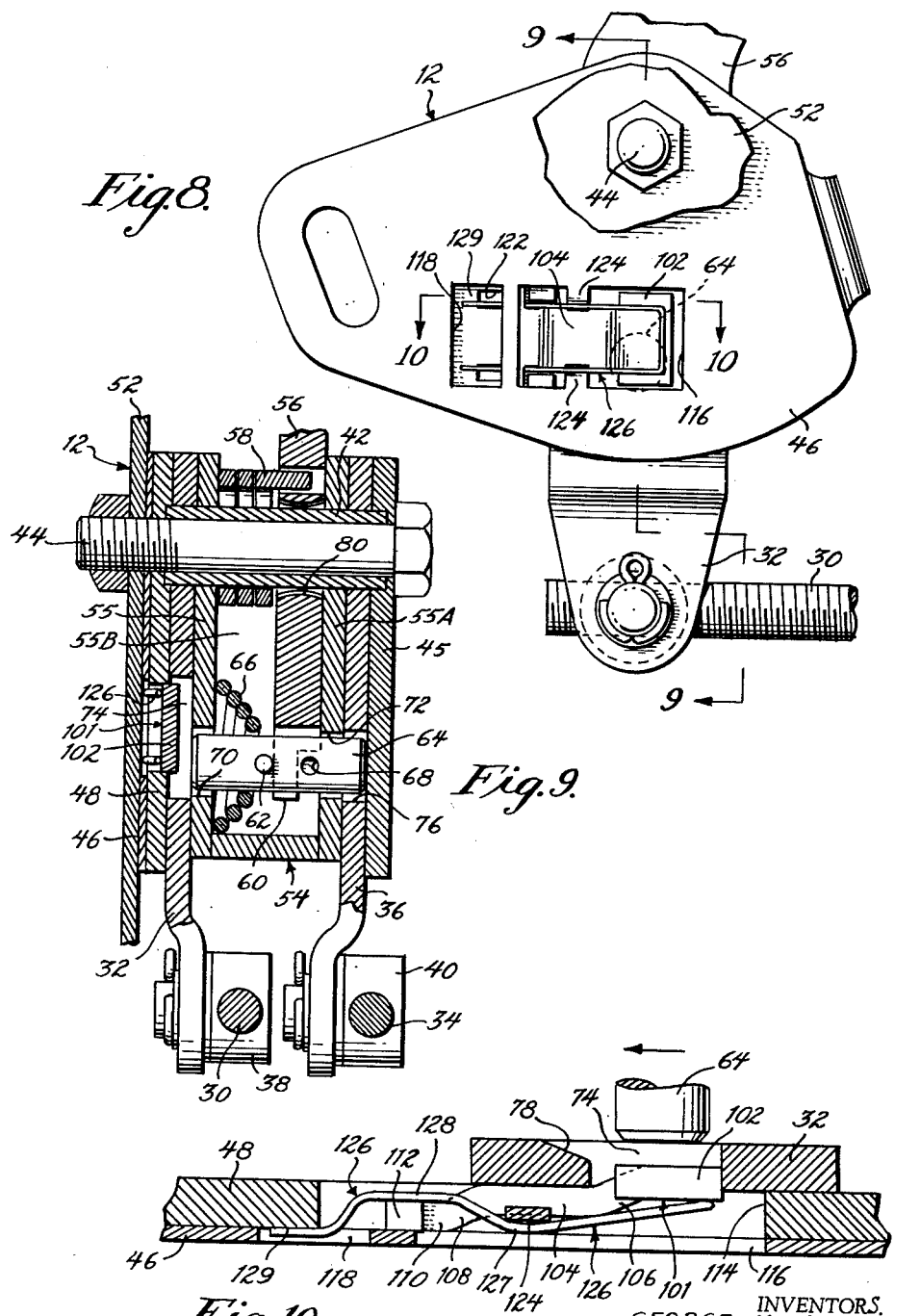
INVENTORS.
GEORGE H. HURST, JR.
WILLIAM G. CAMPBELL
BY
ATTORNEY.

United States Patent Office 3,157,059
Patented Nov. 17, 1964

3,157,059
GEAR SHIFT MECHANISM
George H. Hurst, Jr., Abington, and William G. Campbell, Chalfont, Pa. (both of 341 W. Glenside Ave., Glenside, Pa.)
Filed Jan. 4, 1963, Ser. No. 249,511
5 Claims. (Cl. 74—473)

This invention relates to a gear shifting mechanism of the type used in connection with automobile and other types of transmissions.

A conventional gear shifting mechanism of the type referred to includes an actuating lever which is movable between low and reverse gear positions; another actuating lever which is movable between second and high gear positions; and an operating handle which is selectively engageable with one or the other of said actuating levers selectively to put an engine in low, second, high or reverse gear positions. Also in conventional gear shifting mechanisms, the operating handle has a neutral position, or gate, and must be moved laterally across the neutral gate when it is desired to shift into second or into reverse. This lateral movement is substantially at right angles to the fore and aft shifting movement of the operating handle and is therefore referred to as the H pattern of shifting.

For use in ordinary driving, the momentary pause, or delay, incurred in crossing the neutral gate of the standard H pattern shifting system is of no significance. But, in the case of racing cars, police cars, or ambulances, where instantaneous and maximum acceleration is required, especially in shifting from low to second gear position, the time consumed in moving the operating handle laterally across the neutral gate is critical.

In order to overcome this difficulty, applicants devised and improved gear shifting mechanism which permits substantially straight line movement of the operating handle, thus substantially eliminating the lateral movement of the handle across the neutral position and correspondingly reducing the time needed for shifting from one position to another. This is especially useful in shifting from low to second gear positions to obtain maximum and substantially instant acceleration. The improved straight line shifting mechanism referred to is disclosed in applicant's patent, No. 3,052,135, and will be herein further referred to.

The gear shifting mechanism, or system, disclosed in said patent works perfectly and has been sold in large numbers to dealers and distributors, as well as to large manufacturers of automotive vehicles. But, field experience showed that the driving gear, or the pinion engaged by said driving gear when the transmission is in reverse, or both, were inexplicably and prematurely damaged. Investigation and laboratory experiments revealed that the straight line shifting mechanism referred to also made it possible for the drivers to "slam" the operating handle home with excessive force, especially when shifting from low to second gear position, and that this, in turn, caused the low-reverse driving gear to override its normal position and to clash with the registering pinion of the reverse gear train, with consequent mutilation of one or both of the gears involved.

It is therefore one object of this invention to devise means which will prevent movement of the low-reverse driving gear beyond its prescribed range so as to prevent clashing between the reverse driving and the reverse driven gears, regardless of the force with which the operating handle may be "slammed" into second gear position.

A further object of the invention is to devise a stop which is simple, durable, inexpensive and easy to install and one which can be incorporated in the structure disclosed in the patent aforesaid without materially increasing the cost of, and without materially interfering with, its manufacture and assembly.

The full nature of the invention will be understood from the following specification and the accompanying drawings in which:

FIG. 1 is a fragmentary view, partly in section and partly in side elevation, showing how the low-reverse driving gear engages the low gear when the gear shift lever is moved to low gear position.

FIG. 2 is similar to FIG. 1, but showing the position to which said driving gear moves when the gear shifting lever is moved to second gear position with proper force (solid lines), and the position to which said driving gear moves when the gear shifting lever is moved to the second gear position with excessive force (broken lines).

FIG. 8 is an enlarged side elevational view showing a gear shifting mechanism of the type disclosed in Patent 3,052,135, but provided with the stop mechanism of the present invention.

FIG. 9 is a sectional view looking in the direction of line 9—9 on FIG. 8.

FIG. 10 is an enlarged sectional view looking in the direction of line 10—10 on FIG. 8.

Figure 12:
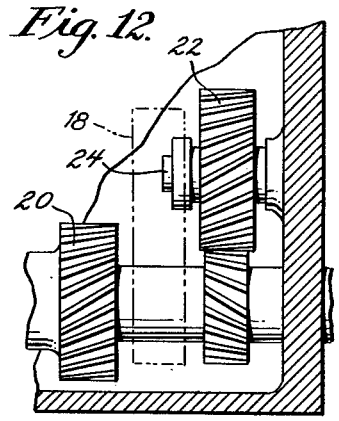
FIG. 12 is a sectional view taken on line 12—12 of FIG. 2.

The gear shifting mechanism is substantially the same as that shown in Patent 3,052,135, but, in order to make extensive reference to this patent unnecessary, such parts of the mechanism as are necessary for understanding this invention, and such parts as are different from, or have no counterpart in, said patent are described below. With this in mind, and referring to the drawings wherein similar reference characters refer to similar parts, 10 designates a gear box which encloses the standard gear trains which are moved to low, second, high and reverse positions by means of a gear shift assembly, generally designated 12, which, in its essential parts, may be identical with the mechanism disclosed in Patent 3,052,135. Since the gear train is standard and forms no part of the present invention, it is enough to say that 14 designates a sleeve clutch, the forward, or left hand end of which is engageable with the second speed gear train, not shown. Clutch sleeve 14 slidably carries a collar 16 which is connected to drive gear 18 which is selectively engageable with low speed gear 20, or with pinion 22, on the shaft of reverse gear 22 (FIG. 12). Conventionally, gear 18 is moved into "low" or "reverse" driving position by means of a pivoted gear actuating lever 26 (FIG. 1) which is connected by means of rod 30 to gear selector lever 32. Actuating lever 28, which moves the gear trains between second and high speed driving positions, is connected by means of rod 34 to gear selector lever 36. Connecting rods 30 and 34 are adjustably secured to bosses 38 and 40 on the corresponding gear selector levers 32 and 36.

Gear selector levers 32 and 36 are pivoted for individual movement on a sleeve 42 (note FIG. 9) which is carried by assembly bolt 44 which also passes through the bight 45 of a U-shaped cover, the limbs 87 and 91 of which are hereinafter referred to and through plate 46. Sleeve 42 also passes through arm 48 of an L-shaped plate, the other arm 86 of which will be hereinafter referred to. As can also be seen from FIGS. 9 and 11 sleeve 42 also engages to an extension 52 of the transmission housing to secure the gear shift assembly to the housing. The gear shifting mechanism also includes a U-shaped housing 54 which is formed of limbs 55 and 55A and a bight 55B and is carried by sleeve 42. Also rotatable on sleeve 42 and disposed between walls 55 and 55A is a gear shift handle or lever 56 which is biased to the right (as viewed in FIG. 9) by a coil spring 58 which encircles sleeve 42. The lowermost end of the handle 56 is provided with a finger 60 which is adapted to engage a radially-extending lug 62 on selector pin 64 which is biased to the right by coil spring 66 bearing against lug 62. Except for the action of spring 66, pin 64 is freely movable transversely of the vertical axis of handle 56. But, if it is desired to integrate pin 64 with handle 56, a lug similar to lug 62 is inserted in hole 68 in pin 64. The insertion of a lug in hole 68 converts the gear shift mechanism from straight line to H-pattern shifting, as set forth in Patent 3,052,135, aforesaid.

The opposite ends of pin 64 extend through apertures 70 and 72 in the opposite side walls 55 and 55A of U-shaped housing 54 and are selectively engageable with apertures 74 and 76 in gear selector levers 32 and 36, respectively. When pin 64 is engaged in aperture 74, movement of handle 56 fore and aft shifts the gears between reverse and low gear driving poistions and when pin 64 engages aperture 76, movement of handle 56 fore and aft moves the gears between second and high driving positions in the manner set forth in Patent 3,052,135. In order to facilitate entry of pin 64 into apertures 74 and 76, I provide ramps 78, one of which is shown in FIG. 10. Also, to permit lateral rocking of gear shift handle 46, the bore 80 through which sleeve 42 passes is flared outwardly, as shown in FIG. 9.

Figure 11:
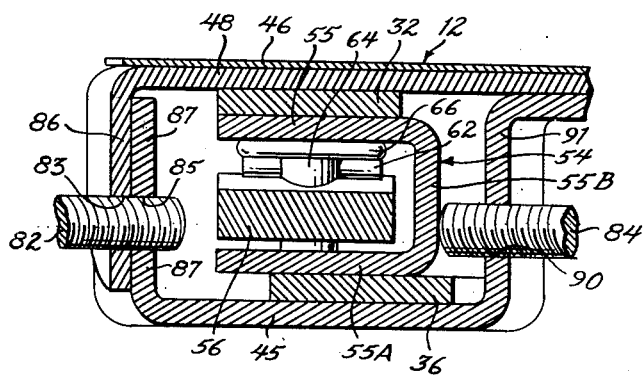
FIG. 11 is a sectional view taken on line 11—11 on FIG. 2.

The assembly further includes stop screws 82 and 84 which are best shown in FIGS. 1 and 11. Screw 82 passes through holes 83 and 85 in previously mentioned arm 86 and limb 87, and serves to limit the movement of handle 56 rearwardly, or to the right as viewed in FIG. 1. Screw 84 extends through hole 90 in flange 91 of cover plate 45 and serves to abut bight 55B of U-shaped housing 54 to limit the movement of handle 56 in the opposite direction.

Figure 6:
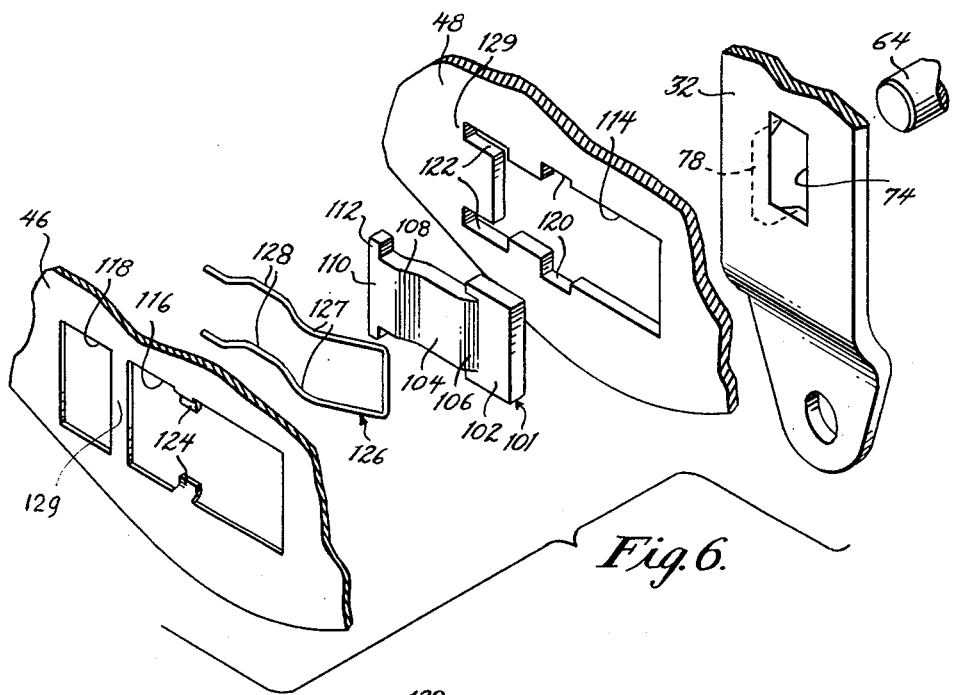
FIG. 6 is an exploded view showing the parts of the movement limiting means of this invention which prevent the clashing of the gears shown in FIG. 3 and 4.
Figure 7:
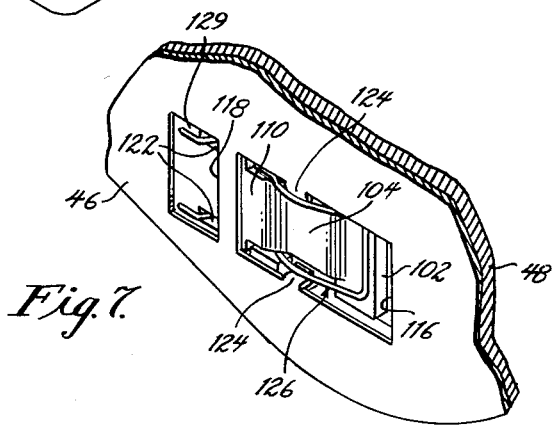
FIG. 7 is a fragmentary perspective view showing the parts of FIG. 6 assembled.

The structure described functions satisfactorily for normal driving conditions. But, as above stated, gear 18 overrides the solid line position of FIG. 2 and clashes with pinion 22 of the reverse gear train if the gear shift handle is slammed hard from "low" into "second" gear. This override is eliminated by the latch 101 which is shown in FIG. 6 and which includes block 102, intermediate stem 104 which is connected to block 102 by offset portion 106, and end portion 110 which is connected to stem 104 by an offset portion 108. End portion 110 is provided with corner lugs 112. Latch 101 is positioned in an opening 114 in wall 48 and in registering openings 116 and 118 in wall 46. Opening 114 is provided with upper and lower recesses 120 and with upper and lower horizontal extensions 122. The upper and lower edges of opening 116 are struck up to provide hooks 124 which are adapted to seat in recesses 120. Latch 101 is detachably retained in position by a U-shaped spring 126, the bight portion of which is adapted to bias block 102 into opening 74 and the limbs of which are bent in one direction, as at 127, FIG. 10, so as to engage hooks 124. The limbs of the spring are bent, in the opposite direction, as at 128, so as to engage lugs 112. The ends of the spring pass through slots 122 and engage the adjacent surface 129 of wall 48 which is to the left of slots 122, as viewed in FIGS. 7 and 8. By this arrangement, the latch is detachably retained in position with block 102 thereof constantly biased to the right, as viewed in FIG. 9, or into opening 74 in plate 32. It will be noted that, when pin 64 is moved to the left, as viewed in FIG. 9 so as to integrate handle 56 with gear selector lever 32, it pushes block 102 out of opening 74 to permit gear selector lever 32 to move with the handle.

Figure 4:
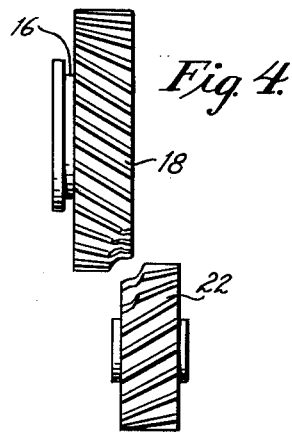
FIG. 4 is similar to FIG. 3 and shows some of the damage which results from the clashing of the gears, as shown in FIG. 3.
Figure 3:
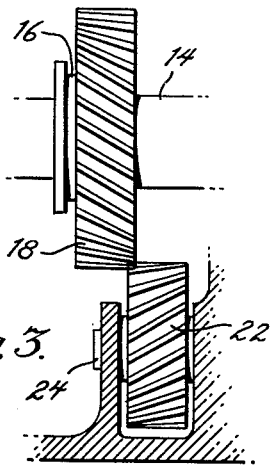
FIG. 3 shows how the driving gear clashes with the registering pinion of the reverse gear train when the gear shift handle is moved to the second gear position with excessive force.
Figure 5:
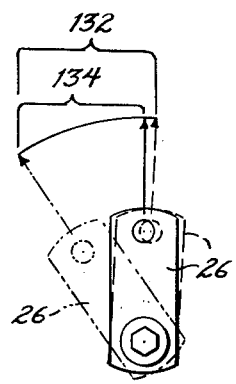
FIG. 5 is a graphic view which was produced by controlled laboratory experiments and shows the range of movement of the driving gear in a shifting mechanism embodying the movement limiting means of the present invention and the range of movement of the same driving gear, in the same mechanism, but without the movement limiting means of the present invention.

The operation is as follows: When gear shift handle 56 is moved into low gear position, pin 64 moves into opening 74 in gear selector lever 32 and pushes block 102 out of opening 74 and into opening 114 in wall 48. As the gear shift handle 56 is moved forwardly toward "second" gear position, pin 64 will move gear selector lever 32 rearwardly, or in the direction of the arrow in FIG. 10. As long as pin 64 is in its extreme left hand position, as viewed in FIG. 9, latch block 102 will be out of engagement with gear selector lever 32 and the latter is free to move. But, as the right hand end of pin 64 reaches ramp 78, spring 66 will begin to move it to the right until it is finally "fired" into aperture 76 in gear selector lever 36 to integrate handle 56 with gear selector lever 36. As pin 64 begins to move out of aperture 74, spring 126 moves latch block 102 into aperture 74 so as to engage and arrest gear selector lever 32, as shown in FIG. 10, before gear 18 reaches the broken line position of FIG. 2. In other words, latch block 102, which enters opening 74 concomitantly with the withdrawal of pin 64 from said opening of gear 18 and prevents it from clashing with reverse pinion 22. This override is shown in FIG. 5 in which the normal movement of gear 18, that is, to the solid line position in FIG. 1, is spanned by bracket 134 and the override, that is, to the broken line position of FIG. 2, is spanned by bracket 132. It is to be noted that FIG. 5 is not an arbitrary diagram. It is actual in that a pencil was mounted on the lever 26 of a mechanism equipped with the stop means of this invention, and the gear shift handle was slammed into second gear position with a measured force. This was done repeatedly and the pencil attached to lever 26 repeatedly inscribed the arc spanned by bracket 134. When the experiment was repeated with the latch means removed, the pencil inscribed the arc spanned by bracket 132. Measurement showed that the difference between the arcs spanned by brackets 132 and 134 is enough to prevent gear 18 from clashing with the reverse gear. It will be noted that by pulling spring 126 out, the latch mechanism can be pulled out also. Wall 46 is thin so as to permit striking and deflecting hooks 124 which retain spring 126 in place. It will be noted that portions 128 of spring 126 are clamped between solid portion 129 of wall 46 and the adjacent wall 48.

What we claim is:

1. A gear shift mechanism for a transmission, said shift mechanism including,
    a housing;
    a gear selecting lever movable in a first direction to place the transmission in low gear and movable in a second direction to place the transmission in reverse gear,
    there being a through opening in said selector lever,
    an operating handle carried by said housing and mounted for rotation about a horizontal axis,
    a pin carried by said operating handle,
    said operating handle being movable in the direction of said axis to move said pin into said opening, to integrate said handle and said lever, said handle being also movable, transversely of said axis, in one direction to move said selector lever in said first direction, and being movable in the opposite direction to move said selector lever in said second direction,
a latch adjacent said selector lever, and
means biasing said latch into said opening concomitantly with the withdrawal of said pin from said opening, to stop the movement of said selector lever before total withdrawal of said pin from said opening.

2. The structure recited in claim 1 in which said latch is pushed out of said opening by the entry of said pin into said opening.

3. The combination with a transmission including
a clutch sleeve selectively movable into engagement with the "second" or with the "high" gear ratio train, and
a "low-reverse" drive gear slidable on said clutch sleeve,
a first movable gear selector lever operatively connected to said "low-reverse" drive gear,
a second movable gear selector lever operatively connected to said clutch sleeve,
a gear shift handle,
a pin carried by said handle and selectively and detachably engageable with said first or said second selector levers, and
means biasing said handle in a direction to engage said pin with said second selector lever,
of a latch adjacent said first selector lever,
there being a through opening in said first selector lever, and
a spring operative to move said latch into said opening during the movement of said first selector lever,
said pin being movable into said opening by said operating handle to push said latch from said first opening and integrate said first selector lever with said operating handle.

4. In combination,
a transmission having "low," "second," "high," and "reverse" gear positions, and
a gear shift assembly including
an assembly bolt secured to the transmission housing and disposed substantially normal thereto,
a generally U-shaped housing pivotally mounted on said bolt for arcuate movement relative to the axis of said bolt,
an operating handle also mounted on said bolt for transverse and longitudinal movement relative to the axis of said bolt and disposed between the side walls of said U-shaped housing,
there being first and second apertures in said side walls of said U-shaped housing, respectively,
a pin carried by said handle and engaging said apertures in all positions of said handle,
a first gear-selecting lever disposed outside, and adjacent, one side wall of said U-shaped housing,
a second gear-selecting lever disposed outside, and adjacent the other side wall of said U-shaped housing,
said levers being pivotally mounted on said bolt for individual arcuate movement transversely of the axis of said bolt,
there being a first through opening in said first gear selector lever,
a second opening in said second gear selector lever,
said openings being selectively engageable by the opposite ends of said pin selectively to integrate said handle with said first, or with said second gear selector lever, for joint movement,
a fixed cover plate adjacent said first lever and having a third opening therein adapted to register with said first opening to receive the adjacent end of said pin,
and a latch for limiting the movement of said first gear selector, including:
an arm carried by said cover plate,
a block at the end of said arm,
a spring normally biasing said block into said first opening whereby said block stops movement of said first lever concomitantly with the withdrawal of said pin from said first opening,
said block being movable out of said first opening by movement of said pin thereinto to permit movement of said first gear selector lever with said handle.

5. The combination with a transmission of the type which has a low, second and high gear and a reverse gear, a first gear selector lever for shifting the transmission to low or to reverse gear, a second gear selector lever for shifting the transmission to second or to high, and an operating handle selectively engageable with either of said selector levers, and wherein shifting the transmission to second gear moves the low gear in the direction of said reverse gear,
of safety means for preventing the low gear from reaching and clashing with said reverse gear as a result of the movement of the operating handle to the second gear position with excessive force,
said safety means including a latch adjacent said first gear selector lever, and
a spring biasing said latch into engagement with said first selector lever to prevent said low gear from reaching said reverse gear, said latch being disengaged from said first selector lever by the engagement of said operating handle with said first selector lever.

References Cited by the Examiner
UNITED STATES PATENTS

| | | | |
|---|---|---|---|
| 2,961,890 | 11/60 | Marshall | 74—477 |
| 3,018,670 | 1/61 | Lohn | 74—477 |
| 3,031,898 | 5/62 | Eaton | 74—476 X |
| 3,052,135 | 9/62 | Hurst et al. | 74—473 |
| 3,082,638 | 3/63 | Nilson | 74—476 X |

BROUGHTON G. DURHAM, *Primary Examiner.*
DON A. WAITE, *Examiner.*